(12) United States Patent
Hsu

(10) Patent No.: US 12,522,414 B2
(45) Date of Patent: Jan. 13, 2026

(54) FULLY RECYCLABLE CONTAINER AND METHOD OF MANUFACTURING THE SAME

(71) Applicant: Yu-Ting Hsu, Taipei (TW)

(72) Inventor: Yu-Ting Hsu, Taipei (TW)

( * ) Notice: Subject to any disclaimer, the term of this patent is extended or adjusted under 35 U.S.C. 154(b) by 22 days.

(21) Appl. No.: 18/617,679

(22) Filed: Mar. 27, 2024

(65) Prior Publication Data

US 2025/0250082 A1    Aug. 7, 2025

(30) Foreign Application Priority Data

Feb. 1, 2024  (TW) .................................. 113103986

(51) Int. Cl.
| | |
|---|---|
| *B65D 65/46* | (2006.01) |
| *B29D 22/00* | (2006.01) |
| *B29D 99/00* | (2010.01) |
| *B29K 23/00* | (2006.01) |
| *B29K 67/00* | (2006.01) |
| *B31C 11/00* | (2006.01) |
| *B65D 8/00* | (2006.01) |
| *B65D 25/14* | (2006.01) |
| *B65D 41/04* | (2006.01) |

(52) U.S. Cl.
CPC ......... *B65D 65/466* (2013.01); *B29D 22/003* (2013.01); *B29D 99/0096* (2013.01); *B31C 11/00* (2013.01); *B65D 15/08* (2013.01); *B65D 15/24* (2013.01); *B65D 25/14* (2013.01); *B65D 41/04* (2013.01); *B29K 2023/18* (2013.01); *B29K 2067/003* (2013.01); *B29K 2995/006* (2013.01); *B65D 2565/382* (2013.01); *B65D 2565/386* (2013.01)

(58) Field of Classification Search
CPC ...... B65D 65/466; B65D 15/08; B65D 15/24; B65D 25/14; B65D 41/04; B65D 2565/382; B65D 2565/386
See application file for complete search history.

(56) References Cited

U.S. PATENT DOCUMENTS

| | | | | |
|---|---|---|---|---|
| 5,738,921 | A * | 4/1998 | Andersen ............... | B29C 67/202 |
| | | | | 428/36.1 |
| 8,870,003 | B2 * | 10/2014 | Dayton .................. | B65D 15/08 |
| | | | | 426/138 |
| 2010/0230405 | A1 * | 9/2010 | Strait, III .......... | B29C 66/24221 |
| | | | | 523/128 |
| 2012/0181292 | A1 * | 7/2012 | Desoto-Burt ........ | B65D 1/0246 |
| | | | | 220/675 |
| 2020/0407100 | A1 * | 12/2020 | Hsu .......................... | B65D 3/22 |

* cited by examiner

*Primary Examiner* — Don M Anderson
*Assistant Examiner* — Jennifer Castriotta
(74) *Attorney, Agent, or Firm* — Chun-Ming Shih; LANWAY IPR SERVICES

(57) ABSTRACT

In a fully recyclable container and a method of manufacturing the same the container includes a cap, a shoulder, a body, a base, and a liner. The cap, the shoulder, and the base are made of biodegradable plastic by injection molding while the body is made of waterproof paper. The cap, the shoulder, and the base are detachably connected to form a housing of the container. The liner is formed inside the housing by blow molding of biodegradable plastic. The respective components of the container are completely made of biodegradable or bio-decomposable material and able to be disassembled for sorting and recycling. Thereby the fully recyclable container completely meets requirements of environmental protection and recycling.

16 Claims, 4 Drawing Sheets

FULLY RECYCLABLE CONTAINER AND METHOD OF MANUFACTURING THE SAME

FIELD OF THE INVENTION

The present invention relates to a container and a method of manufacturing the same, especially to a fully recyclable container and a method of manufacturing the same.

BACKGROUND OF THE INVENTION

Most of drink containers available now are plastic bottles made of PET (polyethylene terephthalate) (also called PET bottles). Mass production and use of the PET bottles generate a lot of waste because that the PET bottles are non-degradable in nature. Thereby how to deal with these PET waste has become an environmental issue of global concerns.

In order to solve the above issue, a plurality of containers made of biodegradable materials has been proposed and put into mass production. For example, manufacturers in America, England, Holland, Denmark, etc. have provided paper-based bottle is integrally formed and completely made of paper material. Although such bottles have advantages of easy and fast production, its structural strength and crush strength are insufficient. Thus the paper bottles are unable to be used as soda bottles or used for mounting other drinks or liquids with gas pressure (such as bubbly water).

In order to overcome the above shortcomings, a liquid container made entirely from natural plant materials is provided in Taiwanese Pat. No. I766398. The liquid container includes a cap, an upper section, a body, and a base. The liquid container made entirely from natural plant materials not only provides excellent structural strength, able to withstand pressure in radial and axial directions but also achieves the purpose of natural degradation or biodegradation. Thereby the environmental issue caused by conventional PET bottles is solved.

In practice, such kind of containers made from natural materials (such as paper bottles) need to meet the following requirements in order to comply with increasingly stringent regulations and industry requirements. The requirements are numbered in order of priority from 1 to 3. (1) The respective components can be recycled and reused. (2) The container is made of bio-based materials. (3) The container is bio-decomposable or bio-degradable.

SUMMARY

Therefore, it is a primary object of the present invention to provide a container which is fully recyclable, bio-degradable or bio-decomposable, and made of bio-based materials in order to overcomes problems of insufficient structural and crush strength of integrally formed paper-based bottles and environmental issues caused by conventional plastic bottles and paper containers.

In order to achieve the above objects, a fully recyclable container according to the present invention includes a cap, a shoulder, a body, a base, and a liner. The cap, the shoulder, and the base are made of biodegradable plastic by injection molding. The body is formed by a spiral paper tube. An opening able to connect with the cap is arranged at a top of the shoulder and a connection portion is extending from a bottom of the shoulder for insertion into a top of the body. The top of the body and the connection portion of the shoulder are provided with a first locking member by which the shoulder and the body are detachably connected. The base includes a bottom surface and a peripheral wall disposed around the bottom surface. The peripheral wall can be inserted into a bottom of the body. The bottom of the body and the peripheral wall of the base have a second locking member by which the body and the base are detachably connected. Thereby the shoulder, the body, and the base are combined to form a housing of a container. Then the liner is formed inside the housing by blow molding of biodegradable plastic and an opening is formed on a top of the liner.

A method of manufacturing the above fully recyclable container according to the present invention includes the following steps. First using a spiral paper tube to produce a body. Then using biodegradable plastic to produce a cap, a shoulder, and a base by injection molding. An opening to connect with the cap is arranged at a top of the shoulder and a connection portion is extending from a bottom of the shoulder for insertion into a top of the body. The top of the body and the connection portion of the shoulder are provided with a first locking member so that the shoulder and the body are detachably connected by the first locking member. The base includes a bottom surface and a peripheral wall disposed around the bottom surface. The peripheral wall can be inserted into a bottom of the body. The bottom of the body and the peripheral wall of the base have a second locking member so that the body and the base are detachably connected by the second locking member. Next combining the shoulder, the body, and the base into a housing of the container. Lastly forming a liner inside the housing of the container by a blow molding process. The liner is made of biodegradable plastic.

Preferably, the shoulder is provided with an external thread formed close to the opening and an internal thread is formed on an inner surface of the cap so that the cap and the shoulder are joined by the internal thread and the external thread screwed into each other.

Preferably, the first locking member includes a first thread disposed on the top of the body and a second thread arranged at the connection portion of the shoulder. The first thread and the second thread can be screwed into each other. The second locking member is composed of a third thread formed on the bottom of the body and a fourth thread mounted to the peripheral wall of the base. The third thread and the fourth thread can be screwed into each other.

Preferably, the first locking member includes a first locking groove disposed on the top of the body and a first locking pin arranged at the connection portion of the shoulder. The first locking groove is able to be engaged with or separated from the first locking pin by rotation. The second locking member includes a second locking groove disposed on the bottom of the body and a second locking pin arranged at the peripheral wall of the base. The second locking groove is able to be locked with or separated from the second locking pin by rotation.

Preferably, the cap, the shoulder, and the base are produced by injection molding of polybutylene succinate (PBS).

Preferably, a spiral paper tube by which the body is formed is produced by winding of waterproof paper with PBS film on an inner side.

Preferably, the biodegradable plastic of which the liner is made is selected from the group consisting of PET and PBS.

Preferably, a circular flange is radially extending outward from a periphery of the opening on the top of the liner. After the cap connected with the opening, the circular flange is located between the cap and the opening.

The shoulder includes a left shoulder portion and a right shoulder portion connected with each other. An edge of a side wall of the left shoulder portion is provided with at least one left locking member extending toward the right shoulder portion and able to be mounted in at least one corresponding right locking recess on a side wall of the right shoulder portion. An edge of a side wall of the right shoulder portion is provided with at least one right locking member extending toward the left shoulder portion and able to be mounted in at least one corresponding left locking recess on a side wall of the left shoulder portion.

The fully recyclable container and the method of manufacturing the same according to the present invention have the following advantages and functions. Firstly, the respective components of the container of the present invention are connected by the locking members, the threads and the rotation, without using a drop of glue. The container is easy assembly. After recycling, the container is easily disassembled to be sorted and reused. Gas barrier and water resistance of the liner are as good as those of conventional plastic bottle. Pressure resistance performance of the body made of spiral paper tubes is better than a plastic bottle and almost as strong as, or even stronger than a glass bottle. Next even without being recycled, the respective components of the fully recyclable container can be decomposed or degraded naturally.

The fully recyclable container according to the present invention is not only able to be 100% decomposed or degraded naturally, but also able to be fully sorted, recycled, and reused. Thus the fully recyclable container is a sustainable and innovative product compliant with ESG (environmental social, and governance) standards.

DETAILED DESCRIPTION

Figure 1:
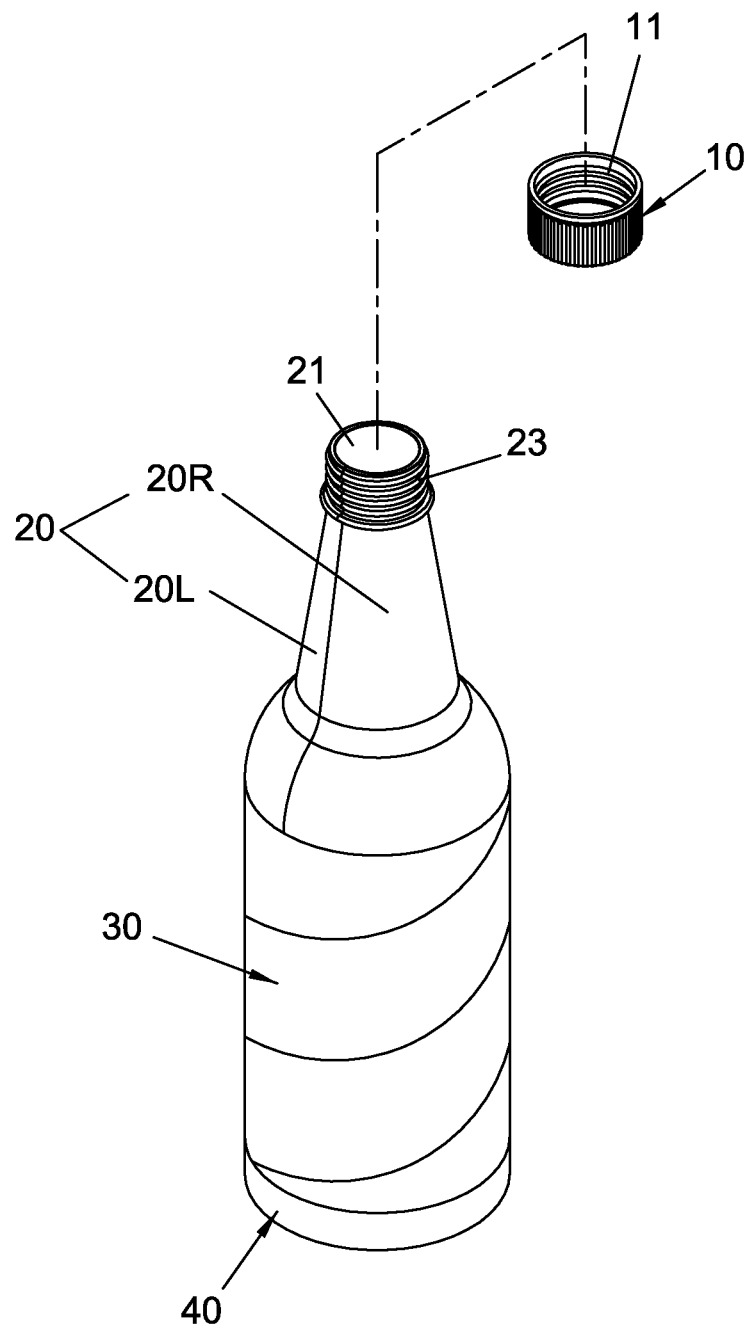
FIG. 1 is a perspective view of an embodiment of a fully recyclable container according to the present invention.
Figure 2:
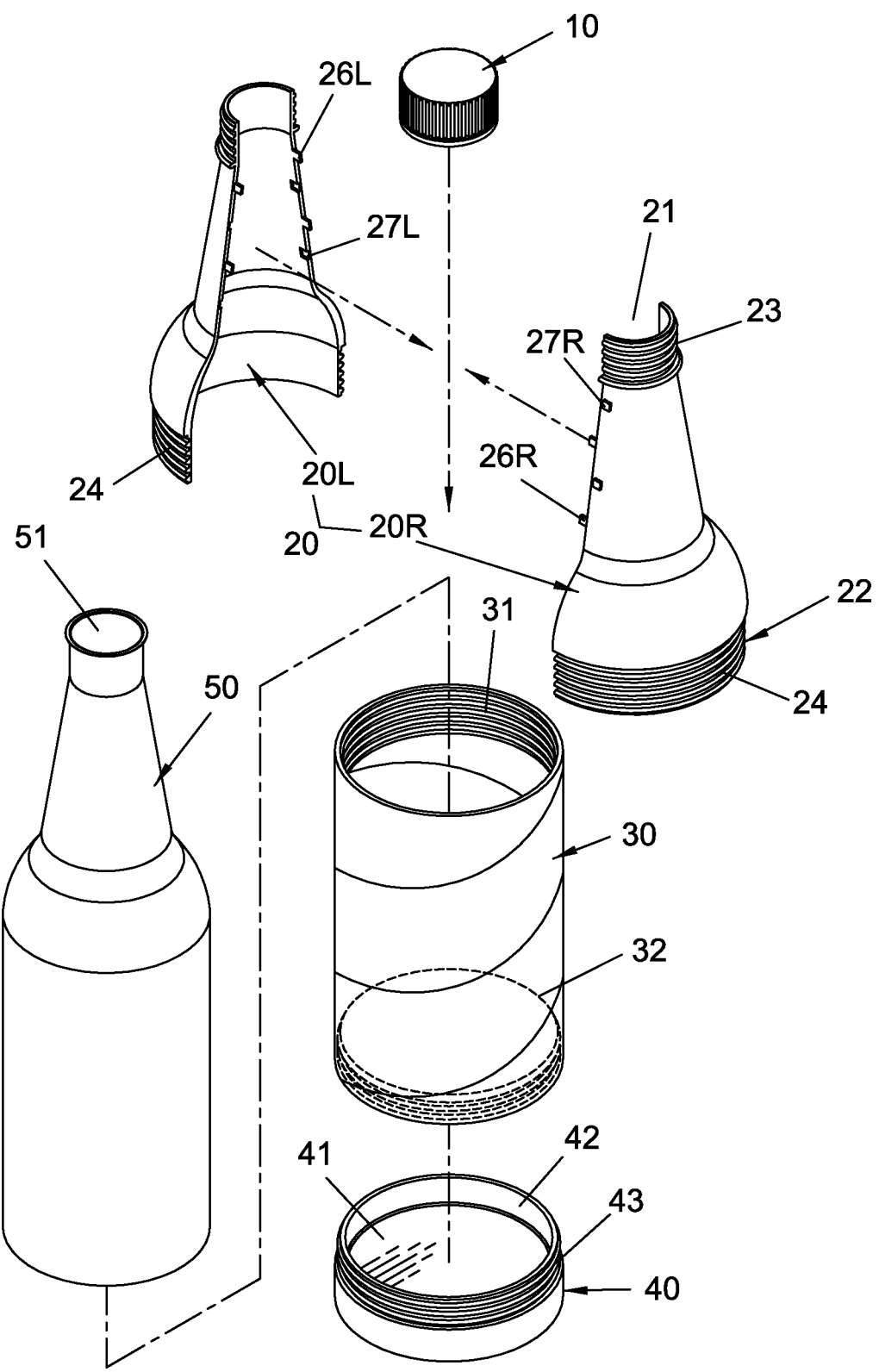
FIG. 2 is an exploded view of an embodiment according to the present invention.

Referring to FIG. 1, a fully recyclable container according to the present invention includes a cap 10, a shoulder 20, a body 30, a base 40, and a liner 50 (as shown in FIG. 2).

A method of manufacturing the above fully recyclable container according to the present invention include the following steps.

Step S1: using a spiral paper tube to produce a body 30;
Step S2: using biodegradable plastic to produce a cap 10, a shoulder 20, and a base 40 by injection molding;
Step S3: combining the shoulder 20, the body 30, and the base 40 into a housing of the container;
Step S4: forming a liner 50 inside the housing of the container by a blow molding process.

In a preferred embodiment, the cap 10, the shoulder 20, and the base 40 are made by injection molding of polybutylene succinate (PBS). The spiral paper tube of the body 30 is produced by winding of waterproof paper with PBS film on an inner side. The waterproof paper is firstly produced by natural plant-based material (such as pure pulp) and then coated with PBS film on one side thereof for recycling purpose. The spiral paper tube is preferably produced by winding of at least two layers of the waterproof paper and the optimal structure is three staggered and overlapped layers of the waterproof paper. Pressure resistance performance of the body 30 made of the spiral paper tube is better than a plastic bottle and almost as strong as, or even stronger than a glass bottle.

The shoulder 20 includes an opening 21 on a top end and able to connect with the cap 10 and a connection portion 22 extending from a bottom of the shoulder 20 and used for insertion into a top of the body 30, as shown in FIG. 2. The top of the body 30 and the connection portion 22 of the shoulder 20 are provided with a first locking member (see below for details). Thus the shoulder 20 and the body 30 are detachably connected with each other by the first locking member.

Referring to FIG. 2, the base 40 includes a bottom surface 41 and a peripheral wall 42 disposed around the bottom surface 41. The peripheral wall 42 can be inserted into a bottom of the body 30. The bottom of the body 30 and the peripheral wall 42 have a second locking member (see below for details) so that the body 30 and the base 40 are detachably connected by the second locking member. Thereby the shoulder 20, the body 30, and the base 40 are combined by the first and the second locking members mentioned above to form a housing of a container. Then the liner 50 is formed inside the housing of the container by blow molding of biodegradable plastic and an opening 51 through while liquid or an object can be filled or placed into the container for storage is produced on a top of the liner 50.

Figure 4:
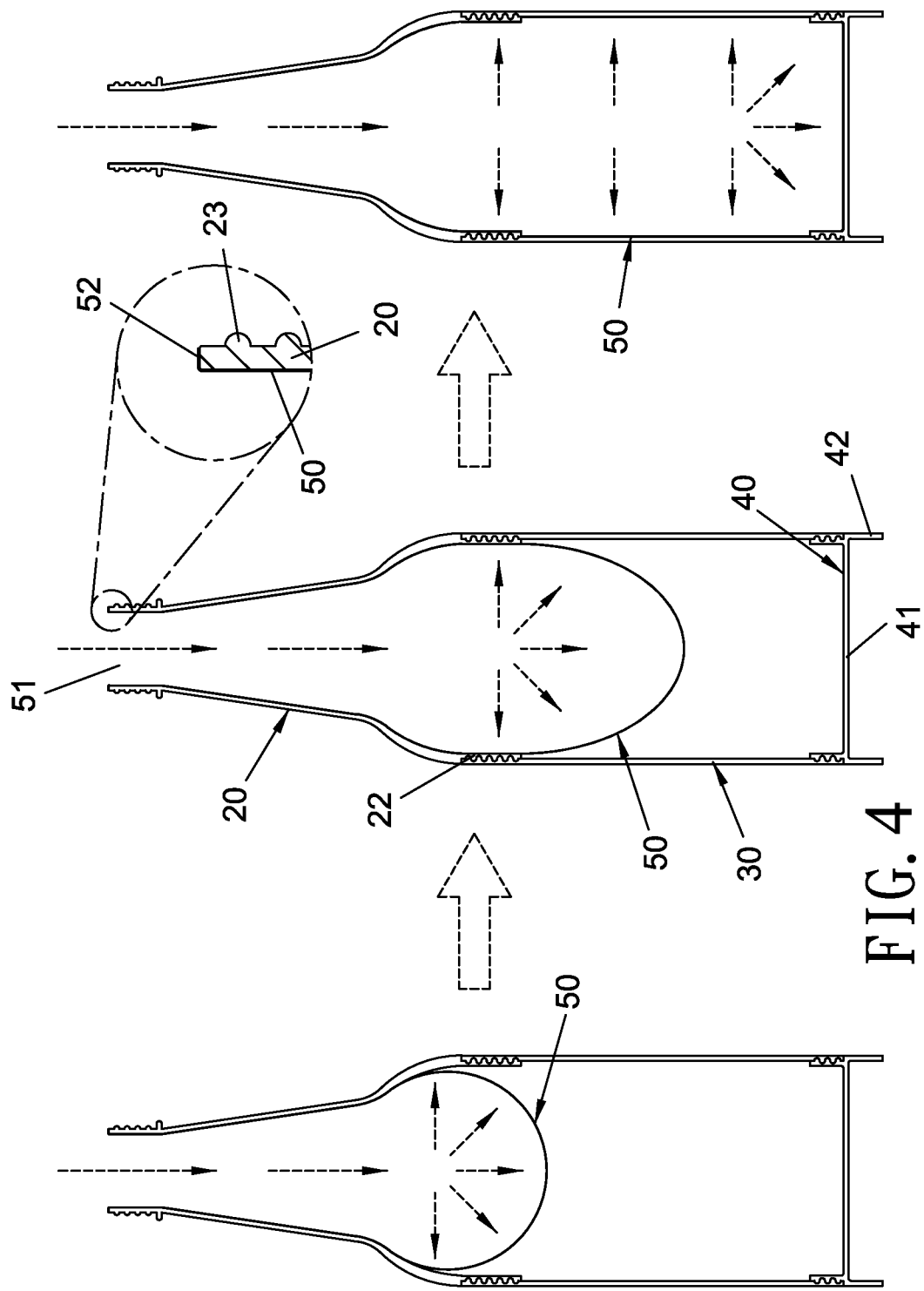
FIG. 4 is a partial sectional view of an embodiment showing formation of a liner inside a housing of a container by a blow molding process according to the present invention.

Referring to FIG. 4, the liner 50 is made of biodegradable plastic. In a preferred embodiment, a material for the liner 50 is either polyethylene 2,5-furanoate (PEF) or PBS. The liner 50 is produced by a blow molding process during which the material is gradually expanded to be closely attached to an inner wall of the housing. Without any adhesive, the material is tightly connected and integrated with the housing to form one part. Moreover, gas barrier and water resistance of the liner 50 are as good as those of conventional plastic bottle. A wall thickness of the liner 50 can be thinner due to the PBS material and the blow molding process.

In a preferred embodiment, the cap 10 and the shoulder 20 are detachably connected by threads. As shown in FIG. 2, the shoulder 20 is provided with an external thread 23 formed at an area close to the opening 21 while an internal thread 11 is formed on an inner surface of the cap 10. Thereby the cap 10 and the shoulder 20 are joined by the internal thread 11 and the external thread 23 screwed into each other. In a preferred embodiment, a circular flange 52 is radially extending outward from a periphery of the opening 51 on the top of the liner 50. After the cap 10 being connected with the opening 21, the circular flange 52 is located between the cap 10 and the opening 21 for better sealing effect between the cap 10 and the opening 21, able to prevent liquid in the container from leaking effectively.

Referring to FIG. 2, an exploded view of a first embodiment according to the present invention is provided. In this embodiment, the should 20, the body 30, and the base 40 are detachably combined with one each other to form the housing of the container by threads. Preferably, the first locking member includes a first thread 31 disposed on the top of the body 30 and a second thread 24 arranged at the connection portion 22 of the shoulder 20. The first thread 31 and the second thread 24 are screwed into each other so that the shoulder 20 and the body 30 are detachably connected. The second locking member is composed of a third thread 32 formed on the bottom of the body 30 and a fourth thread 43 mounted to the peripheral wall 42 of the base 40. The third thread 32 and the fourth thread 43 are threaded with each other so that the body 30 and the base 40 are detachably connected.

Figure 3:
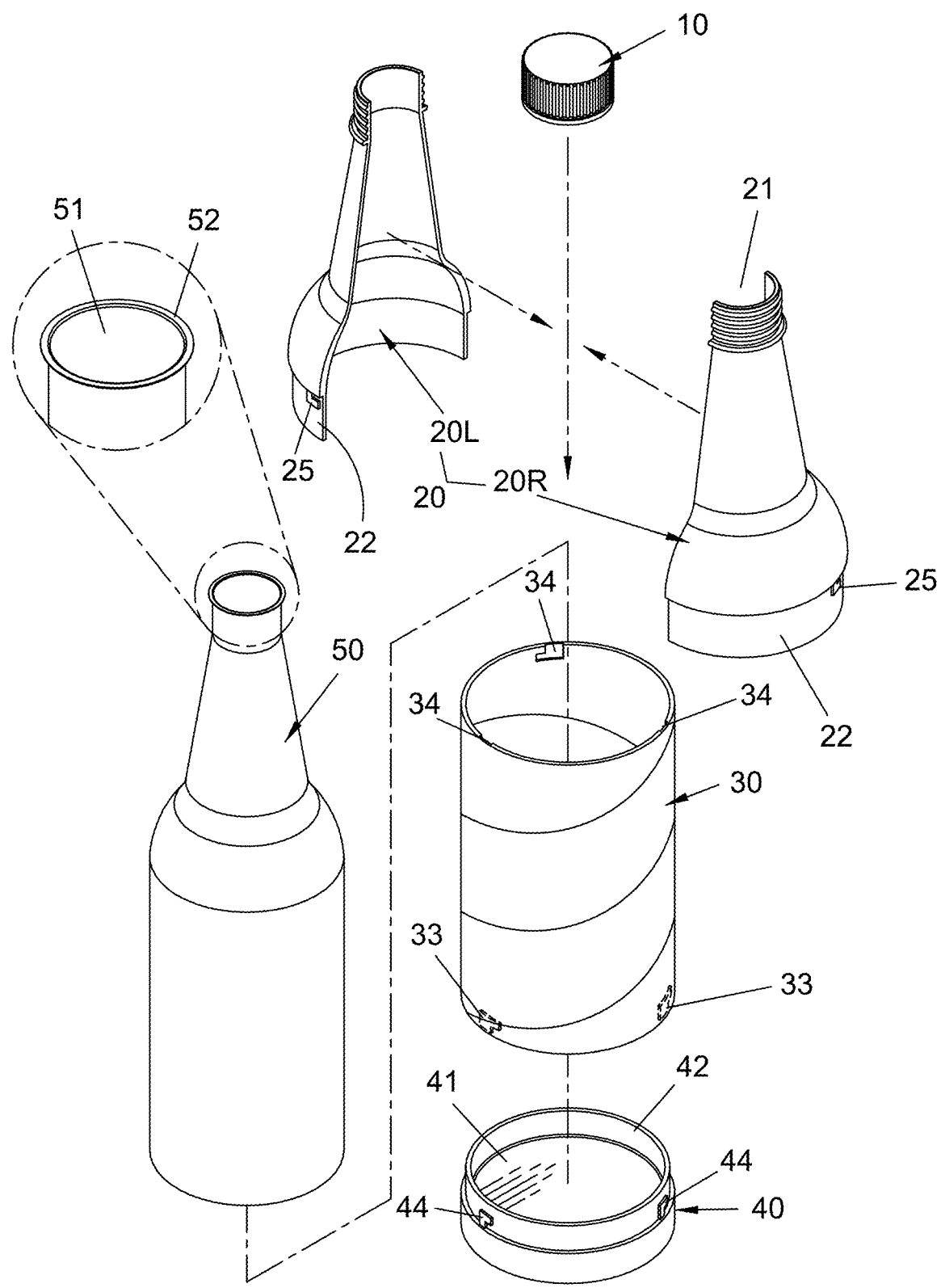
FIG. 3 is an exploded view of another embodiment according to the present invention.

Referring to FIG. 3, an exploded view of a second embodiment according to the present invention is provided. In this embodiment, the shoulder 20, the body 30, and the base 40 are detachably connected to form the housing of the container by locking members and rotation. Preferably, the first locking member includes a first locking groove 34 disposed on the top of the body 30 and a first locking pin 25 arranged at the connection portion 22 of the shoulder 20. The first locking groove 34 is able to be engaged with or separated from the first locking pin 25 by rotation so that the shoulder 20 and the body 30 are detachably connected. The second locking member includes a second locking groove 33 disposed on the bottom of the body 30 and a second locking pin 44 arranged at the peripheral wall 42 of the base 40. The second locking groove 33 is able to be locked with or separated from the second locking pin 44 by rotation so that the body 30 and the base 40 are detachably connected.

Referring to FIG. 2 and FIG. 3, the shoulder 20 includes a left shoulder portion 20L and a right shoulder portion 20R connected with each other. An edge of a side wall of the left shoulder portion 20L is provided with at least one left locking member 26L extending toward the right shoulder portion 20R and able to be mounted in at least one corresponding right locking recess 27R on a side wall of the right shoulder portion 20R. An edge of a side wall of the right shoulder portion 20R is provided with at least one right locking member 26R extending toward the left shoulder portion 20L and able to be mounted in at least one corresponding left locking recess 27L on a side wall of the left shoulder portion 20. Such design of the shoulder 20 formed by the left shoulder portion 20L and the right shoulder portion 20R allows the shoulder 20 to be detached during recycling process for removal of the liner 50 conveniently. Thus the respective components can be disassembled completely to be recycled and reused.

According to the above embodiments, during manufacturing process of the whole container, the respective components of the container according to the present invention are connected by the locking members, the threads and the rotation, without using a drop of glue. The bottle is easy assembly. After recycling, the container is easily disassembled to be sorted and reused. The materials for the respective components such as pure pulp, pure PBS, or pure PEF are pure and single basic material, without mixed with other different raw materials or impurities. Thus the respective components can be decomposed or degraded in nature, even without being recycled.

In summary, the fully recyclable container of the present invention is a sustainable and innovative product compliant with ESG (environmental social, and governance) standards due to 100% naturally decomposable or degradable, sortable, recyclable, and reusable features.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

The invention claimed is:

1. A fully recyclable container comprising a cap, a shoulder, a body, a base, and a liner; wherein the cap, the shoulder, and the base are made of biodegradable plastic by injection molding; the body is produced by a spiral paper tube; wherein the shoulder includes a first opening disposed on a top of the shoulder for connection with the cap and a connection portion extending from a bottom of the shoulder for insertion into a top of the body; the top of the body and the connection portion of the shoulder are provided with a first locking member so that the shoulder and the body are detachably connected by the first locking member; wherein the base is provided with a bottom surface and a peripheral wall which is disposed around the bottom surface and able to be inserted into a bottom of the body; the bottom of the body and the peripheral wall of the base are provided with a second locking member so that the body and the base are detachably connected by the second locking member; wherein the shoulder, the body, and the base are combined to form a housing of the container; the liner is formed inside the housing by blow molding of biodegradable plastic and has a second opening at a top of the liner;

wherein the shoulder includes a left shoulder portion and a right shoulder portion connected with each other; an edge of a side wall of the left shoulder portion is provided with at least one left locking member extending toward the right shoulder portion and able to be mounted in at least one corresponding right locking recess on a side wall of the right shoulder portion; an edge of a side wall of the right shoulder portion is provided with at least one right locking member extending toward the left shoulder portion and able to be mounted in at least one corresponding left locking recess on a side wall of the left shoulder portion.

2. The fully recyclable container as claimed in claim 1, wherein the shoulder is provided with an external thread formed close to the first opening and an internal thread is formed on an inner surface of the cap so that the cap and the shoulder are joined by the internal thread and the external thread screwed into each other.

3. The fully recyclable container as claimed in claim 1, wherein the first locking member includes a first thread disposed on the top of the body and a second thread arranged at the connection portion of the shoulder; the first thread and the second thread are able to fit together; the second locking member having a third thread formed on the bottom of the body and a fourth thread mounted to the peripheral wall of the base; the third thread and the fourth thread are able to screw into each other.

4. The fully recyclable container as claimed in claim 1, wherein the first locking member includes a first locking groove disposed on the top of the body and a first locking pin arranged at the connection portion of the shoulder; the first locking groove is able to be engaged with or separated from the first locking pin by rotation; wherein the second locking member includes a second locking groove disposed on the bottom of the body and a second locking pin arranged at the peripheral wall of the base; the second locking groove is able to be locked with or separated from the second locking pin by rotation.

5. The fully recyclable container as claimed in claim 1, wherein the cap, the shoulder, and the base are made of polybutylene succinate (PBS) by injection molding.

6. The fully recyclable container as claimed in claim 1, wherein the spiral paper tube by which the body is produced is manufactured by winding of natural plant-based material with polybutylene succinate (PBS) film on an inner side.

7. The fully recyclable container as claimed in claim 1, wherein the biodegradable plastic of the liner is selected from the group consisting of polyethylene terephthalate (PET) and polybutylene succinate (PBS).

8. The fully recyclable container as claimed in claim 1, wherein a circular flange is radially extending outward from a periphery of the second opening on the top of the liner; the circular flange is located between the cap and the first opening after the cap is connected with the first opening.

9. A method of manufacturing a fully recyclable container comprising the steps of:
using a spiral paper tube to produce a body;
using biodegradable plastic to produce a cap, a shoulder, and a base by injection molding; the shoulder having a first opening located on a top of the shoulder for connection with the cap, and a connection portion extending from a bottom of the shoulder for insertion into a top of the body; the top of the body and the connection portion of the shoulder having a first locking member so that the shoulder and the body are detachably connected by the first locking member; the base including a bottom surface and a peripheral wall disposed around the bottom surface and able to be inserted into a bottom of the body; the bottom of the body and the peripheral wall of the base having a second locking member so that the body and the base are detachably connected by the second locking member;
combining the shoulder, the body, and the base into a housing of the container; and
forming a liner inside the housing of the container by a blow molding process and using biodegradable plastic as a material for the liner;
wherein the shoulder includes a left shoulder portion and a right shoulder portion connected with each other; an edge of a side wall of the left shoulder portion is provided with at least one left locking member extending toward the right shoulder portion and able to be mounted in at least one corresponding right locking recess on a side wall of the right shoulder portion; an edge of a side wall of the right shoulder portion is provided with at least one right locking member extending toward the left shoulder portion and able to be mounted in at least one corresponding left locking recess on a side wall of the left shoulder portion.

10. The method of manufacturing the fully recyclable container as claimed in claim 9, wherein the shoulder is provided with an external thread formed close to the first opening and an internal thread is formed on an inner surface of the cap so that the cap and the shoulder are joined by the internal thread and the external thread screwed into each other.

11. The method of manufacturing the fully recyclable container as claimed in claim 9, wherein the first locking member includes a first thread disposed on the top of the body and a second thread arranged at the connection portion of the shoulder; the first thread and the second thread are able to fit together; the second locking member having a third thread formed on the bottom of the body and a fourth thread mounted to the peripheral wall of the base; the third thread and the fourth thread are able to screw into each other.

12. The method of manufacturing the fully recyclable container as claimed in claim 9, wherein the first locking member includes a first locking groove disposed on the top of the body and a first locking pin arranged at the connection portion of the shoulder; the first locking groove is able to be engaged with or separated from the first locking pin by rotation; wherein the second locking member includes a second locking groove disposed on the bottom of the body and a second locking pin arranged at the peripheral wall of the base; the second locking groove is able to be locked with or separated from the second locking pin by rotation.

13. The method of manufacturing the fully recyclable container as claimed in claim 9, wherein the cap, the shoulder, and the base are made of polybutylene succinate (PBS) by injection molding.

14. The method of manufacturing the fully recyclable container as claimed in claim 9, wherein the spiral paper tube by which the body is produced is manufactured by winding of natural plant-based material with polybutylene succinate (PBS) film on an inner side.

15. The method of manufacturing the fully recyclable container as claimed in claim 9, wherein the biodegradable plastic of the liner is selected from the group consisting of polyethylene terephthalate (PET) and polybutylene succinate (PBS).

16. The method of manufacturing the fully recyclable container as claimed in claim 9, wherein a circular flange is radially extending outward from a periphery of a second opening on the top of the liner; the circular flange is located between the cap and the first opening after the cap is connected with the first opening.

* * * * *